United States Patent [19]

Leister et al.

[11] 4,229,492

[45] Oct. 21, 1980

[54] CONTROL OF AUTODEPOSITION BATHS

[75] Inventors: Harry M. Leister, Ambler; Joseph C. Donovan, Drexel Hill; Wilbur S. Hall, Plymouth Meeting, all of Pa.

[73] Assignee: Amchem Products, Inc., Ambler, Pa.

[21] Appl. No.: 866,053

[22] Filed: Dec. 30, 1977

[51] Int. Cl.$^2$ .................. B05D 1/40; B05D 1/18
[52] U.S. Cl. .................... 427/345; 427/352; 427/435
[58] Field of Search ............ 427/435, 438, 345, 352; 260/705

[56] References Cited

U.S. PATENT DOCUMENTS

| | | | |
|---|---|---|---|
| 2,658,839 | 10/1953 | Talmey et al. | 427/438 |
| 2,819,188 | 1/1958 | Metheny et al. | 427/438 |
| 3,261,711 | 7/1966 | Sallo | 427/438 |
| 3,438,926 | 4/1969 | Burke et al. | 260/29.7 SQ |
| 3,472,808 | 10/1969 | Isgur et al. | 260/29.7 R |
| 3,585,084 | 6/1971 | Steinbrecher et al. | 427/435 |
| 3,592,699 | 7/1971 | Steinbrecher et al. | 427/435 |
| 3,647,567 | 3/1972 | Schweri | 427/435 |
| 3,709,743 | 1/1973 | Dalton et al. | 427/435 |
| 3,876,434 | 4/1975 | Dutkewych et al. | 427/438 |
| 3,936,546 | 2/1976 | Hall | 427/435 |

FOREIGN PATENT DOCUMENTS

72/1146  2/1972  South Africa .................. 427/435

OTHER PUBLICATIONS

Industrial Finishing Magazine, Mar. 1977, pp. 39–43, Cathodic Electrocoating Tank.

*Primary Examiner*—John D. Smith
*Assistant Examiner*—Richard Bueker
*Attorney, Agent, or Firm*—Ernest G. Szoke

[57] ABSTRACT

An autodepositing coating process wherein a coating bath containing an acidic aqueous coating composition comprising as essential ingredients: (1) an acid; (2) an oxidizing agent; and (3) an aqueous dispersion of coating forming resin particles and surfactant, which surfactant is subject to being slowly altered by the acidic oxidizing environment in the metal coating bath resulting in the buildup of reaction products in the bath, which bath is maintained in continuous coating forming operability by replenishing in a manner which prevents the deterioration of the coating quality of the bath. The coating composition and replenishing composition may also contain as an optional ingredient an aqueous dispersion of pigment and surfactant and may also contain non-essential ingredients, which non-essential ingredients may increase in concentration as the bath is operated until a deleterious effect is asserted on the coating formation. The coating quality of the replenished bath is maintained by the addition of an aqueous surfactant composition and by operating the replenished bath at an elevated redox potential or by removal of the altered surfactant.

4 Claims, No Drawings

CONTROL OF AUTODEPOSITION BATHS

FIELD OF THE INVENTION

Autodeposition of resinous film forming materials is a relatively recent development in the art of coating metallic surfaces and thus only a few commercial installations utilize such processes. The process has a number of distinct advantages over the conventional metal coating processes by eliminating the need for organic solvents commonly employed with dip or spray processes without the high energy requirements of electrocoat. In practice, however, the commercial introduction of autodeposition as an economical process for coating metal continuously on a large scale has encountered difficulties which could not be foreseen from laboratory or small scale and intermittant operations. As used herein, the term autodeposition is intended to encompass coating processes wherein a coating forming composition of low solids concentration, usually on the order of about 10% to 15% by weight of film forming particles dispersed in an aqueous acidic composition, is employed to deposit a coating of particles on a metal surface immersed in the composition, such that the solids concentration of the deposited coating is substantially greater than the solids concentration of the coating composition, and in a manner such that the coating increases in thickness or weight the longer the time the metal surface is immersed therein, without the aid of any externally applied driving force such as electricity. Compositions which have the capability of depositing coating forming particles from an acidic aqueous dispersion thereof in the manner described above are referred to herein as autodepositing coating compositions. For practical commercial operation, it is preferred that such autodepositing coating processes be capable of substantially continuous operation. In order to provide for substantially continuous operation, the coating composition must be such that the operating bath can be continually replenished with an aqueous concentrate of coating forming particles without any significant change in coating quality or coating forming capability. In formulating the autodepositing coating compositions, there are generally present non-essential ingredients which may not be consumed in the coating process at the same rate as the essential ingredients. The concentration of non-essential ingredients in the working bath tends to increase as the bath is continually replenished. The buildup of non-essential ingredients can adversely affect the coating process in a number of ways, including the stability of the bath itself, its ability to coat and the quality of the coatings formed. A coating bath in continuous operation is constantly changing, so if the coating quality and the coating forming capability are to be maintained after successive replenishments of the bath, it is necessary to take steps to avoid deleterious effects on the coating forming quality of the bath which would otherwise be caused by changes in the operating characteristics of the bath. This invention is directed to providing a process for continual replenishment of an autodepositing coating composition which enables the bath to be operated continuously without impairing the coating forming capability of the composition or the quality of the coatings produced.

PRIOR ART

Autodepositing coating processes are disclosed in a number of patents including U.S. Pat. Nos. 3,585,084 and 3,592,699, assigned to the assignee of the present application.

U.S. Pat. No. 3,709,743 discloses an acidic aqueous coating composition of a resin and nitric acid preferably operated at a pH below 2.

South African Patent No. 72/1146 discloses an acidic aqueous coating composition containing about 5 to about 550 g/l of resin solids, a soluble ferric-containing compound in an amount equivalent to about 0.025 to about 3.5 g/l ferric ion, and acid in an amount sufficient to impart to the composition a pH within the range of about 1.6 to about 5.0. Optionally an oxidizing agent may be used in an amount to provide from about 0.01 to about 0.2 oxidizing equivalent per liter of composition. Examples of the aforementioned ferric-containing compounds are ferric fluoride, ferric nitrate, ferric chloride, ferric phosphate and ferric oxide. Examples of acids are sulfuric, hydrochloric, hydrofluoric, nitric, phosphoric, and organic acids, including for example, acetic, chloracetic, and trichloracetic. Examples of oxidizing agents are hydrogen peroxide, dichromate, permanganate, nitrate, persulfate, and perborate. The preferred composition is described as comprising about 5 to about 550 g/l of resin solids, about 1 to about 5 g/l of ferric fluoride trihydrate, and hydrofluoric acid in an amount sufficient to impart to the composition a pH within the range of about 1.6 to about 5.0.

Belgian Patent of Addition No. 811,841 discloses a coating composition containing about 5 to about 550 g/l of resin solids, a metal-containing compound which is soluble in the composition and acid to impart to the composition a pH within the range of about 1.6 to about 5.0. Examples of the soluble metal-containing compound are silver fluoride, ferrous oxide, cupric sulfate, cobaltous nitrate, silver acetate, ferrous phosphate, chromium fluoride, cadmium fluoride, stannous fluoride, lead dioxide, and silver nitrate. The metal compound is present in the composition in an amount within the range of about 0.025 to about 50 g/l. Examples of acids that can be employed are sulfuric, hydrochloric, hydrofluoric, nitric, and phosphoric, and organic acids such as acetic, chloracetic, and trichloracetic. The use of hydrofluoric acid is preferred. Optionally, an oxidizing agent may be used in an amount sufficient to provide from about 0.01 to about 0.2 of oxidizing equivalent per liter of composition. Examples of oxidizing agents are hydrogen peroxide, dichromate, permanganate, nitrate, persulfate, and perborate.

British Pat. No. 1,241,991 discloses an acidic aqueous coating composition containing an oxidizing agent and solid resin particles stabilized with an anionic surfactant. The composition is substantially free of nonionic surfactant. The resin particles comprise about 5 to about 60 wt. % of the composition. The anionic surfactant comprises about 0.5 to about 5 wt. % based on the weight of the resin. Examples of anionic surfactants are the alkyl, alkyl/aryl or naphthalene sulfonates, for example, sodium dioctyl sulphosuccinate and sodium dodecylbenzene sulfonate. The oxidizing agent is described as being of the kind commonly known as a depolariser, and preferably is present in the composition in an amount of about 0.02 to about 0.2 N. Examples of oxidizing agents are hydrogen peroxide, p-benzoquinone, p-nitrophenol, persulfate, and nitrate. Acids such as phosphoric, hydrochloric, sulfuric, acetic, trichloroacetic, and nitric are used to impart to the composition a pH of preferably less than 5.

U.S. Pat. No. 3,936,546 also assigned to the assignee of the present application discloses a method for prolonging the stability of the coating baths. In this latter patent the problem is one in which the buildup of oxidized metallic ions in the bath causes the dispersed resin to coagulate, flocculate or gel throughout the bath, rendering the bath itself unstable and eventually inoperative.

It has now been found that with prolonged operation of an autodepositing bath not only the stability of the bath itself but the coating forming quality of the bath can be affected. This is particularly true in baths comprising aqueous dispersions of resin particles also containing one or more surfactants or emulsifiers as well as byproducts or formulation ingredients such as defoamers and the like, added in the preparation of the resin particle dispersion or latex.

Polymeric latices suitable for use in autodeposition processes are disclosed in U.S. Pat. No. 3,472,808. It has also been found that among the latices suitable for autodeposition, good results can be obtained by using a latex in which the emulsifier concentration is below the critical micelle concentration (CMC), that is, the concentration at which aggregation of the surfactant occurs to form micelles. Latex compositions of this type are disclosed for example in U.S. Pat. No. 3,438,926. Among the preferred emulsifiers employed in the latices described in the patents noted above and in other prior art disclosures, the sulfates and sulfonates are among a preferred group for use in forming resin particle dispersions suitable for autodeposition. Such surfactants however, are subject to being chemically modified or otherwise altered by the acidic oxidizing environment of an autodepositing coating composition. The formation of such altered surfactant products during the course of the coating operation may result in a buildup of undesired materials in the coating bath, causing a decrease in the coating forming quality of the bath.

It is therefore an object of this invention to provide a means by which the continuous operation of an autodepositing coating bath can be maintained free of adverse effects of the buildup of altered surfactant products or other non-essential components added in the course of replenishing the coating composition. This and other objects of this invention will be more fully understood from the description which follows:

BRIEF SUMMARY OF THE INVENTION

When an autodepositing coating bath comprising an aqueous acidic dispersion of resin particles and surfactant and an oxidizing agent is operated continuously by periodic replenishment with resin concentrate and other essential ingredients, buildup of undesired products in the coating bath and transformation of other ingredients causes a deterioration in the coating forming quality of the replenished bath. Such deterioration has been manifested primarily as a loss of wet adhesion in the autodeposited coating and a decrease in the rate of growth of the coating during the time a metal surface is immersed in the coating forming composition. In accordance with this invention, it has been found that the coating quality of the autodeposition bath can be maintained for an indefinite period of continuous bath operation by adding to the replenished bath a surfactant-containing dispersion which is stable to the acidic bath composition. The surfactant addition is preferably made in the form of a dispersion of pigment, the pigment being an optional, though generally desirable ingredient of the coating composition. It has also been found that the manner in which the surfactant is added is critical for maximum effectiveness in maintaining the coating quality of the bath. The addition of the surfactant with a portion of the existing bath which has been withdrawn for that purpose and returning the blended composition to the main body of the coating bath. Additionally, it has been found necessary to increase the operating redox potential of the replenished bath in order to maintain the rate of coating formation about the same as that obtained with a newly prepared bath having about the same concentration of essential ingredients. The redox potential is increased by addition of oxidizing agent.

Alternatively, the coating quality of the bath can be extended for continuous operation by removal of surfactant that has been modified by exposure to the coating composition. Removal of the modified surfactant can be achieved for example by solvent extraction.

DESCRIPTION OF THE PREFERRED EMBODIMENTS

Autodeposition compositions of the type to which this invention is directed are described for example in U.S. Pat. Nos. 3,585,084, 3,592,699 and 3,709,743, in British Pat. No. 1,241,991, in South African Patent No. 72/1146 and in Belgian Patent of Addition No. 811,841. In general terms, the coating compositions described therein and elsewhere are believed to function by dissolution of the metal immersed in the composition. As the metal ions form at the metal surface, they destabilize the resin dispersion causing resin particles to deposit on the metal surface. The particles are generally composed of resin and absorbed surfactant. In the preferred embodiments, the surfactant is of the type which can form a bond with the divalent metal ion, forming ferrous bridges to interconnect the resin particles through the surfactant. Suitable surfactants are the sulfonates such as: sodium alkyl-benzene sulfonates, e.g., Ultra wet surfactants; the alkylnaphthalene sulfonates and polymeric forms thereof, e.g., Daxad and Aerosol OS and Alkanol B; The alkyl sodium sulfosuccinates, e.g., Aerosol-OT; the alkyl sulfates, e.g., Duponal and similar surfactants. In a typical resin dispersion, or latex utilized in autodepositing compositions, the major surfactant is sodium dodecylbenzene sulfonate. This surfactant has been found to be particularly useful in preparing latices of styrene/butadiene resins and copolymers with styrene/butadiene. Available latices commonly use salts of alkyl aryl sulfonic acids as emulsifiers and particularly sodium dodecylbenzene sulfonate.

As a further preferred characteristic of autodeposition compositions, it is desired to employ a latex wherein the resin is maintained as a dispersion or colloid with a minimum amount of surfactant, generally less than the critical micelle concentration and preferably less than the amount which can be adsorbed or bound by the organic resin particles present. A latex in which the amount of surfactant is less than that amount which can be bound to the organic resin particles present in the latex is referred to herein as a "surfactant starved resin". It will be appreciated, therefore, that such latices will have little or no surfactant freely in solution and consequently few or no surfactant micelles. Furthermore, it is characteristic of such latices that additional surfactant added to the latex can be adsorbed onto the resin particles and depending upon the amount of surfactant added, the latex may still be composed of a surfactant starved resin. Latices of this type which have been found to pose a problem in continuous autodeposition processes are described for example, in copending application Ser. No. 664,613, now abandoned assigned to the same assignee as the present application, and the disclosure of which is hereby incorporated by reference. When used in the formation of autodeposited coatings, the resin compositions are preferably used in conjunction with a pigment and the coating bath is suitably prepared by first combining an aqueous dispersion of resin with an aqueous dispersion of pigment in the manner disclosed in copending application Ser. No. 718,605, now U.S. Pat. No. 4,177,180 assigned to the same assignee as the present application and the disclosure of which is hereby incorporated by reference. The concentrate formed in this manner is utilized both as the concentrate for initial bath makeup, and as a replenisher for maintaining the solids content of the bath within its operative range as work is continuously processed through the bath.

It has now been found that in continuous operation, the content of the coating bath changes as the essential components are "turned over." By bath turnover is meant that amount of bath replenishment which replaces an amount of resin solids, removed during continuous processing of work through the bath, equal to the amount present in the bath at start up. As the bath is worked, the resin solids and pigment are depleted by depositing as coating on the metal surface and by drag out. The bath is periodically restored to about its original resin solids and pigment content by the addition of replenisher comprising a resin/pigment concentrate of the type used for bath makeup. Other essential ingredients including acid (HF in a preferred embodiment), ferric fluoride, and oxidizer (preferably hydrogen peroxide) are added as necessary to maintain the pH, redox potential, active fluoride content and iron content of the bath within the normal operating parameters.

An "aged" or worked bath is one which has had at least one bath turnover and has accordingly been replenished with resin/pigment concentrate to provide a cumulative amount of resin solids equal to the amount of resin solids in the coating bath at makeup. It has now been found that notwithstanding the fact that the essential ingredients are all present in the bath in coating forming concentrations and the operating parameters of the bath are within the ranges at which a fresh bath produces excellent coatings, the coating quality of an aged bath deteriorates. Under certain operating conditions, the coating ability deteriorates with continued throughput until after several turnovers, usually about 3 to 4, the bath has to be discarded and a fresh bath made up. To avoid such costly shutdowns and losses of materials, it is desirable for use in commercial production that the operative life of the bath be extended substantially.

The deterioration of coating quality in an aged bath is manifested as a severe decrease in the deposition rate and loss of wet adhesion, i.e., the wet coatings do not resist rinsing. If a correction is not made, the bath is no longer cuitable for commercial use. Without wishing to be bound to any specific theory and recognizing that the cause of this deterioration is not fully understood, it is believed to be due in the main to two possible causes. It is likely that both causes are responsible along with other conditions that change as the bath is worked. First, there is a buildup of univalent cations, particularly sodium, potassium and ammonium ion, and in turn the formation of gegenions which increase the stability of the bath so that the coating particles are not as readily destabilized at the metal interface. These ions build up in the bath because they are present in the latex and they are not consumed in the coating process. The source of these ions is the additives unintentionally carried into the bath in the latex or other components. For example, the buffer which is added to the resin dispersion or latex and which may contain such compounds as trisodium phosphate and ammonium citrate or the initiator residue from the polymerization, which may be potassium sulfate formed from the potassium persulfate initiator all contribute to the composition of the coating bath. Since the consumption of these other ingredients is not directly proportional to the resin consumption, their concentration varies in a way that changes the coating characteristics of an aged bath and in some cases, for example, with sodium ion buildup, effects may be evident even before a complete bath turnover. Such nonessential ingredients may also be derived from dragged in cleaner if the rinsing procedure is not sufficiently thorough or from rinse water if it is not completely deionized. It is believed that the effect of gegenions is to increase the stability of a colloid. Such effect on the autodeposition composition makes it less sensitive to the polyvalent cations that cause coating deposition, e.g., ferrous ion.

A second factor believed to cause coating quality deterioration is the oxidation product formed when the combination of iron and hydrogen peroxide reacts with the surfactant. This product is no longer precipitable by ferrous ion and will cause inability to form iron bridging in the deposited coating.

The slow deposition rate can be partially overcome by increasing the redox potential of the bath to a level which is slightly higher than that normally used. This means using more hydrogen peroxide than usual and can result in still further modification of the surfactant.

In accordance with the improved process of this invention, the modified surfactant can either be removed from the bath by solvent extraction or it can be effectively sequestered by solubilization within a surfactant micelle or a micelle surrogate. The formation of surfactant micelles is undesireable because they slow the deposition rate still further. However, if the surfactant is present as an adsorbed layer on a pigment, or similar inert particle, it performs the same function by selectively dissolving the modified surfactant within the hydrocarbon or nonpolar segment of the surfactant adjacent to the pigment particle. In this way, the ability of a surfactant to solubilize an organic material can be utilized without the disadvantage of having surfactant micelles present in the bath. It has also been found that if the replenisher (resin/pigment concentrate) is blended into a portion of the bath in a separate tank rather than adding it directly to the bath, the ability of the surfactant starved replenisher to sequester the modified surfactant is markedly improved. It is believed that the replenisher has a greater selectivity for solubilization of the modified surfactant than it does for other solubilizable species, e.g., the unmodified surfactant species. However, if the replenisher is simply pumped into the bath, its ability to remove modified surfactant is diminished because it will also remove unmodified surfactant. If the replenisher is added to a portion of the bath in a separate tank where mixing can be more intense and more effective, the selectivity for the modified surfactant can be used more advantageously by permitting the pigment/surfactant particles to contact a larger portion of bath in a shorter period of time than would be possible if the pigment dispersion were placed directly in the relatively slow moving bath itself.

It has also been found that in an aged bath, the surfactant concentration is diminished notwithstanding surfactant is replenished along with resin and pigment in the same proportion as exists in a fresh bath. This has been found to be the case even when the modified product which builds up in concentration as the bath is worked is taken as part of the total surfactant present. However, it is believed that the presence of modified surfactant rather than the decrease in total surfactant concentration has a deleterious effect on coatings produced by an aged bath replenished in the usual manner because additions of fresh surfactant alone is not sufficient to eliminate the problem.

In general, as has already been noted, the bath can be corrected to maintain the coating quality for an indefinite period of continuous operation or the deterioration can be prevented by several alternative methods. The preferred method, owing to its practical applicability, is the method whereby the replenished bath is kept at a uniform level of coating quality by adding the replenishing resin/pigment concentrate utilizing the premixing steps which constitute a process improvement aspect of this invention. In accordance with this method, the resin/pigment concentrate is added to the coating bath by removing a portion of the aged bath and thoroughly blending with the replenisher concentrate in a separate pre-mixing tank and thereafter blending the pre-mixed composition with the remaining contents of the coating bath. Preferably the premixing is accomplished with about equal amounts by volume of resin/pigment replenisher concentrate and aged bath, though the ratio can be varied within wide practical limits. If an excess of the replenisher concentrate is used in the premixing step the upper limit on the amount of replenisher is such that the pH of the premixed composition must not exceed about pH 5. Since the aged bath generally is operated at about pH 3 and the replenisher concentrate has a pH of about 8 to 9, the limit on the amount of excess replenisher can be readily determined for any particular composition. Likewise, where the amount of aged bath is in excess of replenisher, practical considerations dictate an upper limit of about 8 to 10 volumes of aged bath for each volume of replenisher to be added.

Among the preferred latices used in autodeposition processes, a latex prepared from styrene, butadiene, vinylidene chloride and methacrylic acid appears to be the most widely used. The improvement of this invention will be described with specific reference to autodeposition compositions and coating baths employing such latices, though it is understood that the methods employed can be readily adapted for use with other latices suitably employed in autodepositing processes. The preferred latex having resin particles prepared from styrene, butadiene, vinylidene chloride, and methacrylic acid has a surfactant content of about 1 to 4% based on resin solids. The surfactant content is mostly sodium dodecylbenzene sulfonate also known as Ultrawet K, along with minor amounts of a sulfosuccinate surfactant. In addition, the latex contains such additives as ammonium citrate and sodium phosphate as a buffer, and a potassium sulfate residue from potassium persulfate used as a polymerization initiator. Such latices are available under the Darex brand name from the W. R. Grace Company. The latex is generally supplied as an aqueous dispersion having about 54 to 56% by weight total solids. In preparing the resin/pigment concentrates presently used in commercial autodeposition processes, a latex of the type described is blended with a pigment dispersion comprising about 30% by weight carbon black and about 5% by weight mixed anionic and non-ionic surfactants. The preferred nonionic surfactants are the polyoxyalkyl surfactants particularly the condensates of ethylene oxide with hydrophobic bases formed by condensing propylene oxide with propylene glycol which are commercially available under the Pluronic brand name, particularly Pluronic F68 and Pluronic F38. The surfactants employed for addition to the aged bath, in accordance with the method of this invention, are those described above having a high molecular weight preferably on the order to 8000 to 9000 and an HLB number (Hydrophilic Lipophilic Balance) of about 29, though surfactants with greater or lesser HLB numbers can also be used.

Improvement in an aged bath, as previously indicated, can be accomplished by addition of such surfactant as an aqueous solution, though as noted, the results are better when the surfactant is added as a dispersion with inert particles such as the carbon black pigment. The resin/pigment concentrate utilized in the autodepositing replenishing concentrate ordinarily contains about 35 parts of latex to 1 part of pigment dispersion on a volume to volume basis. Greater or lesser amounts can be used. In the method of this invention, the resin/pigment concentrate described above is utilized to replenish an aged bath by pre-mixing with a portion of the aged bath and returning the pre-mix to the bath.

Alternatively, the coating quality of an aged bath can be improved, with respect to the water rinseability and film build of the coatings formed in the bath, by adding a solution or dispersion of a non-ionic surfactant of the type described with respect to the pigment dispersion. In order to achieve the desired improvement in coating quality, the surfactant, like the pigment, should be added to the bath by pre-mixing. The particular surfactant utilized must be stable to the acid oxidizing composition in the coating bath. Generally, surfactants such as the Pluronic surfactants described above have been found to possess good stability when added to the bath at the concentration indicated.

In addition to pre-mixing replenisher as described above, the coating quality of the bath is further improved or maintained by operating the aged bath at a redox potential substantially higher than that at which a fresh bath is maintained. When an autodeposition coating bath of the type described is first made up, the redox potential is adjusted and maintained between about 275 and about 325 millivolts (using a silver/silver chloride reference electrode) to provide coatings of about 1 mil film thickness in about 75 seconds. When an aged bath is replenished by pre-mixing in order to overcome the problems of decreased film build and poor rinseability, it has been found that the improvement in coating quality in both wet adhesion and rate of film formation is enhanced by simultaneously increasing the operating redox potential to a range of 400 to 500 millivolts and preferably about 400 to 475 mv. For the purposes of this invention, the upper limit is not critical, though at about 500 mv and above cracking of the coating may occur. The need to operate an aged bath at higher redox potential than is required for a new bath in order to obtain about the same coating performance is not entirely understood, though it is believed to be related to increased gegenion concentration and increased colloidal stability of the resin particles, and possibly to match the redox potential of the iron couple adjusted to the changed bath conditions. As a further modification of the aged bath, it has already been noted that the conductivity increases. Similarly, the free acid content of the aged bath changes, though neither of these conditions have required correction in order to restore or maintain the coating capability of an aged bath. Accordingly, the aged bath can be operated at a higher conductivity and a lower free acidity. In the case of free acidity, the aged bath can be operated at a free acidity of about 2 ml, whereas a new bath is operated at about 10 ml. By free acidity is meant the number of ml of 0.1 N sodium hydroxide solution needed to neutralize a 10 ml sample of solution to a brom-phenol-blue endpoint. In this particular case the titration is done potentiometrically.

In yet another embodiment of this invention, it has been found that as the bath is worked, the total surfactant concentration in the bath decreases in proportion to resin solids, notwithstanding the surfactant added in replenishing the bath is present in about the same amounts relative to resin solids as in the makeup concentrate. By separating the surfactant component of an aged bath, it has also been found that at least a portion of the surfactant has been chemically altered, and that the altered surfactant, when added to a fresh bath, causes a significant adverse change in the coating quality of the fresh bath with respect to both rinseability and film build of the coatings produced. The altered surfactant is believed to be primarily attributable to oxidation of one or more of the aromatic or sulfonate moieties of the surfactants present in the coating bath. Such oxidation may be the result of free radical formation by the peroxide and iron ions present in the bath. Certain surfactants such as Pluronic surfactants act as scavengers of free radicals, thereby protecting against reaction with the aromatic or sulfonate moieties to prevent excessive alteration of these surfactants. It is believed that the free radical oxidation of alkyl aryl sulfonate salts present in the latices used in autodeposition baths can be prevented or deterred by the addition of a free radical absorber and that the addition of a high molecular weight nonionic surfactant such as Pluronic F68 performs this function.

Alternatively, the deleterious effect of the altered surfactant believed to be the oxidized sodium dodecylbenzene sulfonate can be overcome by removing the altered surfactant from the coating composition. This can be accomplished by solvent extraction. It has been found that an aged bath, in which the coating forming ability has deteriorated to the point that little or no coating is formed during a normal coating time of about 1 to 1.5 minutes, and any coating which does form is easily washed off by water rinsing, can be restored to a coating forming quality equivalent to a fresh bath by removal of the surfactant reaction product present in the bath. The surfactant reaction product has not been fully characterized, though it is believed to be the product of free radical oxidation of sodium dodecylbenzene sulfonate. The surfactant reaction product can be removed without destruction or harm to the coating bath by extraction with an organic solvent. Any water-immiscible solvent can be employed and such solvents as the chlorinated hydrocarbons, e.g., 1,1,1-Trichloroethane (Chlorothene) have been found to be well suited to the extraction, which is accomplished by simply agitating a mixture of the coating bath and solvent, allowing the organic solvent and aqueous phases to separate and drawing off the organic solvent phase containing the modified surfactant product. On evaporating the solvent, the reaction product is obtained as a dark, viscous liquid.

It will be understood that the various preventive and corrective procedures for continuous operation of an autodepositing coating bath described herein may be used alternatively or in combination or successively depending on the circumstances of the specific working bath involved. It is intended that all variations of these procedures, whether employed singly or in combination, come within the scope of this invention. These process improvements will be more fully understood by reference to the illustrative examples which follow.

EXAMPLES

In order to demonstrate the present invention, there are presented below a series of examples showing the use thereof. Comparative examples are set forth also.

EXAMPLE 1

This example illustrates the preparation of a laboratory amount of aqueous resin/pigment concentrate and the use thereof in an autodepositing composition. Unless stated otherwise, the term "percent" means wt. percent based on the total weight of the stated composition.

Five grams of an aqueous carbon black pigment dispersion (sold under the trademark Aquablak 115) were added to a beaker. Thereafter, 180 g of a latex containing about 54 percent solids (the resin of the latex comprising about 62 percent styrene, about 30 percent butadiene, about 5 percent vinylidene chloride, and about 3 percent methacrylic acid) were poured into the beaker rapidly over a period of about 10 seconds with vigorous stirring. A suitable latex is available from the W. R. Grace Company under the brand name Darex.

The water soluble content of the latex employed was about 2 percent based on the weight of dried resin, with the water soluble content comprising about 10 precent sodium phosphate, about 13 percent sodium dodecylbenzene sulfonate. The sodium phosphate is a buffering agent used in preparing the latex and the other water soluble materials are surfactants. The pH of the latex is about 7.8 and the surface tension thereof about 45–50 dynes/cm. The average particle size of the resin in said latex is about 2000 A.

The black pigment dispersion employed has a total solids content of about 36 percent. The carbon black comprises about 30 percent of the dispersion. It has a pH of about 10 to about 11.5 and a specific gravity of about 1.17. The dispersion contains a surfactant of the non-ionic type available under the brand name Pluronic.

An autodepositing composition was prepared by combining the above resin/pigment composition, 3 g of ferric fluoride, 2.3 g of hydrofluoric acid, and water to make 1 liter.

EXAMPLE 2

This example illustrates a typical coating bath made up with a resin/pigment concentrate of example 1. A typical autodeposition coating bath is made up and operated as follows:

Resin/pigment concentrate is introduced into a coating tank in an amount determined to give solids concentrations of 10 to 12% when diluted to the volume of the coating bath. Add deionized water to nearly the desired volume. Add hydroflouric acid in an amount sufficient to give 1.8 to 2.1 g/l as HF in the final coating solution and ferric fluoride to give 1.8 to 3.8 g/l of $FeF_3$ in the final coating solution (the hydrofluoric acid and ferric fluoride are conveniently combined in a single concentrate in the predetermined ratio). Deionized water is added to bring the amount of solution to the final volume of the coating bath. The operating parameters are established by measuring the non-volatile materials to determine resin content normally maintained between about 8 and 12%. The fluoride activity is measured with a Lineguard Meter 101 available from Amchem Products, Inc., and used to measure hydrofluoric acid concentration. The 101 meter reading is maintained between about 800 and 1200 micro amps. The redox potential is measured with a potentiometer employing a platinum electrode and a suitable reference electrode such as calomel or silver/silver chloride. The operating range for the fresh bath (no turnovers) is about 275 mv to 325 mv. Total iron concentration is titrated and the bath maintained so as to provide total iron concentration as iron between about 0.9 and 1.5 grams per liter. Whenever the redox reading drops below the lower limit hydrogen peroxide is added periodically in amounts sufficient to raise the redox to within the operating range. As the bath is worked it is replenished with resin/pigment concentrate to maintain the non-volatile materials (NVM) level. HF solution is added as necessary to maintain the Lineguard 101 reading within the operative range. Other acids such as phosphoric acid can be added to control iron dissolution.

EXAMPLE 3

A commercial autodeposition bath prepared in accordance with the process of application Ser. No. 718,605 or in accordance with examples 1 and 2 above was aged by processing metal through the bath and replenishing to 3 to 4 turnovers. A sample of the aged bath was taken and adjusted to 242 to 255 mv and a Lineguard 101 Meter reading of 750. Steel panels were treated in accordance with the two treatment sequences indicated as Cycle A and Cycle B. The panel appearance and salt spray results are given below.

| Cycle A 3" × 4" panel | | Cycle B 2" × 3" panel | |
|---|---|---|---|
| Cleaner | | Cleaner | |
| Water Rinse | | Water Rinse | |
| D.I. Water Rinse | | D.I. Water Rinse | |
| 60 sec. immersion | | 60 sec. immersion | |
| 60 sec. set time | | immediate wash off under tap water hose (hose flow 1000 ml/ 30 sec.) | |
| Water Rinse (30 sec.-dip) | | | |
| 3% acidulated reduced chrome rinse (30 sec. dip) | | Wash off 60 sec. | |
| Cure 10 min/160 degrees C. | | Cure 2 min/160 degrees C. | |
| Panel | Panel Appearance | Panel | Panel Appearance |
| 1A Control | Rundown from hole and drain pattern bottom half of panel | 1B Control | Almost complete wash off |
| | Film thickness .45–.47 ml | | Remaining is a fairly uniform film .15 ml thick |
| | Overall panel fairly uniform | | |
| Bath modified by addition of 1 gram of Aquablak 115 (premixed with 50 ml of bath). | | | |
| 2A | Pigment appeared to floc badly after 20 sec. set time | 2B | Complete wash off of coating except near top |
| | Coating appearance rather mottled and very thin in spots, near side edges. Film thickness .37 ml | | |
| 2 gm Aquablak (total) plus Redox adjusted with $H_2O_2$ from 230 to 255 mv | | | |
| 3A | Floc again appeared on panel after 20 sec. of set time | 3B | Almost as bad as 2B |
| | Coating thickness varied across panel. Almost bare just off center to side edges Film thickness .37 ml | | Same pattern |
| Total of 4 gm of Aquablak 115 added (premixed with 50 ml, then 100 ml, then 250 ml before addition to rest of bath). | | | |
| 4A | Flocculation not as noticeable, film uniformity across panel much better - only close to side edges almost bare. Film thickness .4 mil. | 4B | About equal to 3B |
| Redox of 4A and 4B bath increased to 320 mv with $H_2O_2$ | | | |
| 5A | Flocculation not as noticeable as 3A. Film uniformity good across panel with indications of their areas near side edges-better than 4A Film thickness .3–.34 mil. | 5B | Much better than 4B. Film uniformity good across panel with wash off to very thin film only at side edges |
| | | | Film thickness .3 mil. |
| Redox of bath increased to 415 mv with $H_2O_2$. | | | |

| | | | |
|---|---|---|---|
| 6A | On all panels except this one, coating during set time took on a puffy appearance. On this panel the coating did not puff and seemed tight. Film uniformity was very good. Entire panel remained coated with some thinning near sides, etch rate 60 mg/ft 2 min. Film thickness .4–.45 mil. | 6B | Panel appearance good - definitely better than 5B. No wash off to bare metal. Although the panel looked better than 5B, film thickness was measured at .25 mil. |
| Bath aged overnight. | | | |
| 7A | Similar to 6A but film thickness .35 mil. | 7B | Not as good as 6B but still significantly better than 1B |

EXAMPLE 4

This example shows the results in coating quality of an aged bath to which a non-ionic surfactant (Pluronic F68) is added and the redox potential adjusted.

| Test No. (3 panels each) | | Redox (mv) | Solids | Total Solids Added | Film |
|---|---|---|---|---|---|
| 1 | Aged bath as in | 305 | | | very thin |
| 2 | + .75 c.c. (6.67% F68) | | .05 | .05 | very thin |
| 3 | Adj mv + .75 c.c. (6.67% F68) | 400 | .05 | .10 | field nearly bare but top and bottom edges look heavy. |
| 4 | + .75 c.c. (6.67% F68) | 400 | .05 | .15 | immediate wash off |
| 5 | + .75 c.c. (6.67% F68) | | .05 | .20 | immediate wash off |
| 6 | + .75 c.c. (6.67% F68) | | .05 | .25 | immediate wash off |

EXAMPLE 5

This example illustrates the film build developed with addition of Pluronic F-38 and F-68LF (as solutions having 10% solids concentration) to the baths using a regular cycle as indicated with an aged bath:

Cycle-Clean, rinse, D.I. rinse, immersion in coating bath an aged bath of example 2, bath 1 min, set 1 min., dip rinse (tap) 30 sec., 3% acidulated chrome rinse 30 sec., cure 10 min. at 160° C.

| Panel | Surfactant | Addition (ml. soln.) | Total Gm. of Solid | Appearance | Film Thickness* |
|---|---|---|---|---|---|
| Control | — | — | — | uneven film poor edge coverage | .52 mil |
| 1 | F-38 | 0.5 | .05 | uniform thin coating brown edges | .355 mil |
| 2 | F-38 | 0.5 | .1 | uniform coating brown edges (+1 min H₂O tap rinse) | .375 mil |
| 3 | F-38 | — | .1 | uniform coating edges better | .49 mil |
| 4 | F68 LF | 1.0 | .1 | uniform coating edges not bad | .55 mil |

*Film thickness is the arithmetic average of the coated panels (2 in each set)

The panel appearance using Pluronic F68 LF and F-38 is better and film thickness measurement is more consistent across the whole panel. The film build using Pluronic F-68 is better than the control.

Higher molecular weight non-ionic surfactants are effective in restoring coating forming quality of an aged bath.

EXAMPLE 6

This example illustrates the improvement in coating quality of an aged bath when 4 gm/l of Aquablak 115 is added and the redox is raised to 400 mv. Panels were given immediate rinse.

| Treatments | Addition | Film Thickness | Comments |
|---|---|---|---|
| control | none | .13–.22 mil. | very thin coating |
| 1 | + (4 ml/l Aquablak) (H₂O₂ to 400 mv) | .2–.25 mil. | Good looking coating uniform black |
| 2 | Processed 3 sq. ft. with replenishing 6 ml resin/pigment, 0.2 ml H₂O₂/sq. ft.) | .12 mil. | thin mottled coating Note: redox at 230 mv despite periodic oxidizer addition. |
| 3 | Replenished for 4th sq. ft. (no HF) | .2–.29 mil. | Good looking black coating |
| 4 | Processed total of 8 sq. ft. with replenishment (and adjustment, mv 420) | .24–.29 mil. | Grainy looking on drying - good looking black |

The results demonstrate that high oxidizer concentration (peroxide) is required along with pigment addition.

EXAMPLE 7

This example illustrates additional panels coated with the same aged bath as in Example 6 showing the effect of operating at elevated redox.

elevated redox on an aged bath. Four bath examples were prepared as shown and panels treated in the normal cycle. The results are shown below.

|  | 1 | 2 | 3 | 4 |
|---|---|---|---|---|
|  | aged bath +4ml Aquablak "S"/l | aged bath +4ml Aquablak "S"/l + H₂O₂ to 470 mv | aged bath +4ml Aquablak "S"/l + 3ml Aquablak 115/l | aged bath +4ml Aquablak "S" 3 ml Aquablack 115/l + H₂O₂ to 470 mv |

Control
Redox Potential 230 mv and 490

|  | PANELS | | | |
|---|---|---|---|---|
| Control | 1A | 2A | 3A | 4A |
| Appearance | | | | |
| uniform brown-black | Almost bare | Black uniform brown edges | Bare except tip and bot. edge | Black uniform pretty good edges |
| Film Thickness | | | | |
| .15 mil (230 mv) .3 mil (490 mv) | .07 mil. | 0.3 mil. | .0–.15 mil. | .35 mil. |

| No. of Ft.² of Panel | Bath redox Adjusted | Appearance | Film Thickness |
|---|---|---|---|
| Control | 230 | Panel almost bare | |
| 1 | 400 | Definite improvement but thin areas near edges | .15–.26 |
| 2* | 400 | thin | .2 |
| 3* | 400 | thin | .13 |
| 4 | 400 (HF added) | thin | .15–.21 |
| 5 | 400 (HF added) | sl-mod. improvement | .24–.31 |
| 6 | 400 (resin pigment and H₂O₂ added) | uniform black | .31–.39 |

Data of examples 5, 6 and 7 indicates a combination of parameter adjustments are necessary for the coating improvement.
redox mv ≧ 400 mv
Black pigment or Pluronic F68 LF at (0.1 gm sol/l)

*Lineguard 101 meter reading about 200 indicating hydrofluoric acid concentration below normal operating parameter

EXAMPLE 8

This example illustrates the addition of Aquablak and adjustment of redox potential in an aged bath.

Aquablak 115 Addition
Panels were prepared in an aged bath by coating with 1 min. and immediately rinsing with tap water.

| Panel | mv | Film Thickness | Appearance |
|---|---|---|---|
| 1 | 315 | .03 mil. | Almost bare |
| 2 | 410 (.2% Aquablak 115) | .1–.15 mil. | Almost bare in spots. Slight coating in others |
| 3 | 410 (.4% Aquablak 115) | .25–.3 mil. | Coating good, sl. brown edges |
| 4 | 410 | .2–.25 mil. | Coating good but—3 small bare spots on side. Brown edges. |

Aquablak 115 addition at ~400 mv redox potential gives a big improvement over control at 315 mv.

EXAMPLE 9

This example illustrates the effect on coating quality of the addition of Aquablak S and Aquablak 115 with The results illustrate the improvement with non-ionic surfactant (Aquablak 115) as compared to little or no improvement with an anionic surfactant (Aquablak S).

EXAMPLE 10

A 10% resin/pigment solids bath was prepared containing 1.5 gms of FeF₃/liter and 2.1 gms of HF/liter, and increments of a solution containing 25 gms NaHf₂ per liter were added. Panels coated in the usual laboratory procedure gave the following results:

| Total mls NaHf₂ soln. added | Added ppm Na⁺ | ppm Na⁺ Corrected for diln. | Coating thickness (mils in 90 secs.) |
|---|---|---|---|
| 0 | 0 | 0 | 0.95 air-dry |
| 20 | 186 | 183 | 0.85 air-dry |
| 40 | 372 | 358 | 0.75 air-dry |
| 80 | 744 | 689 | 0.60 air-dry |
| 80 | 744 | 689 | 0.35 no air-dry |
| 120 | 1116 | 996 | 0.50 air-dry |
| 120 | 1116 | 996 | 0.12 no air-dry |
| 200 | 1860 | 1550 | 0.30 air-dry |
| 200 | 1860 | 1550 | 0.50 air-dry |

NaHF₂: MW 62 = 37.2% Na

Analysis of a commercial bath that had been aged to 3 to 4 turnovers found 960 ppm of Na. This bath gave low coating rates and poor rinseability to about the same degree as this example.

In addition to the resin solids the latex used in preparing the bath has the following components added when manufactured.

| Buffer: | | gms/100 gms monomer |
|---|---|---|
| | Ammonium citrate (NH₄)₃C₆H₅O₇ | 0.3 |
| | Sodium Phosphate Na₃PO₄ | 0.2 |
| pH adj: | 1% Ammonia (28% NH₃) | 1.1 |
| Surfactant: | 1.2 gms mixed surfactants | 1.2 |
| Initiator: | 1.3 gms potassium persulfate K₂S₂O₈ | 1.3 |

Based upon these ingredients, the cation concentrations in the latex are:

| Source | Ion | gm/100 gms polymer | ppm in bath (10% NV) |
|---|---|---|---|
| $(NH_4)_3C_6H_5O_7$ | $NH_4+$ | 0.0666 | 67 $NH_4+$ |
| $Na_3PO_4$ | $Na+$ | 0.0842 | 84 $Na+$ |
| $NH_4OH$ | $NH_4$ | 0.28 | 280 $NH_4+$ |
| Surfactants* | $Na+$ | 0.087 | 87 $Na+$ |
| $K_2S_2O_8$ | $K+$ | 0.419 | 419 $K+$ |

*assuming 100% Sodium dodecylbenzene sulfonate.

The various cations in the bath add up as follows:

|  | ppm | mols |
|---|---|---|
| $NH_4+$ | 374 | 0.0208 |
| $Na+$ | 171 | 0.00743 |
| $K+$ | 419 | 0.0107 |

To determine the effect of these materials in the latex, a series of batches of resin/pigment concentrate were prepared and adding to each batch one of the materials discussed in an amount equal to its original concentration.

To the resin/pigment composition of:
5.0 gms Aquablak 115
180.0 gms latex

The following materials were added in the listed amounts:

| Batch 1 | Control - nothing | |
|---|---|---|
| Batch 2 | $Na_3PO_4 \cdot 12 H_2O$ | 0.2 gm |
| Batch 3 | $(NH_4)_3C_6H_5O_7$ | 0.3 gm |
| Batch 4 | $K_2SO_4$ | 0.84 gm* |
| Batch 5 | Defoamer 3325 | 0.1 |

*equivalent to the $K_2S_2O_8$ initiator

The resin/pigment concentrate was observed and the following changes noted.

After 72 hrs.

Control: Very slight amount of white at top. Fairly good blue color; some evidence of adsorption to glass.

$NA_3PO_4.12H_2O$: Identical $(NH_4)_3C_6H_5O_7$: Same but grayer $K_2SO_4$: Very light blue; coats glass very rapidly; white layer on top.

Defoamer 3324: Not quite as blue as the $K_2SO_4$ batch; incipient glass coating; small amount of white on top.

EXAMPLE 11

Using the water soluble materials present in the latex, baths were made up containing increasing concentrations of those materials to compare against the performance observed in an aged bath.

The amounts of materials used were multiples of the following concentrations:

| $Na_3PO_4 \cdot 12 H_2O$ | 0.2 gm/l |
|---|---|
| $(NH_4)_3C_6H_5O_7$ | 0.3 gm/l |
| $K_2SO_4$ | 0.84 gm/l |

Control:

185.0 gms resin/pigment concentrate
3.0 gms ferric fluoride
2.3 gms hydrofluoric acid
$H_2O$ to 1.0 liter The multiples added were 1X, 2X, and 4X. Panels were treated 90 secs and rinsed immediately, then baked. Film thicknesses were as follows:

| Control | 0.95 mil | |
|---|---|---|
| 1X | 0.85 mil | Represents straight-line decrease |
| 2X | 0.7 mil |  |
| 4X | 0.5 mil |  |

2X barely showed brown edges.
At 4X, brown edges were very pronounced.

EXAMPLE 12

This example illustrates the use of Aquablak to eliminate the loss of wet adhesion and decrease in film build. The tests were run using an aged bath.

Panels were coated 90 secs, rinsed, and baked.

| | Coating Thickness | |
|---|---|---|
| (1) Aged Bath: | 0.15 mil | Redox 400 |
| (2) +1gm Aquablak 115 | 0 mil | |
| (3) +1gm Aquablak 115 | 0 mil | |
| (4) +1gm Aquablak 115 | 0 mil | |
| (5) +1gm Aquablak 115 | 0 mil | Redox 220 |
| Raised Redox to 490 | | |
| (6) — | 0.25–0.5 mil | jet glossy, uneven |

EXAMPLE 13

To illustrate the difference in stability of the bath to ferrous ion, small amounts of 25% $H_2SiF_6$ were added to 100 mls of fresh bath of the composition of Example 1 and 100 mls of a similar bath after working for 3 to 4 turnovers.

Fresh Bath: The addition of 1.4 mls of 25% of $H_2SiF_6$ produced fairly large amounts of coagulum in the bath. Signs of destabilization were apparent at very much lower levels of $H_2SiF_6$.

Aged Bath: Even after addition of 4.6 mls of $H_2SiF_6$ solution, there was no indication of destabilization.

EXAMPLE 14

To illustrate how the surfactant undergoes modification in the bath, three solutions were prepared as follows:

| | sodium dodecylbenzene sulfonate | $FeF_3$ | HF | 30% $H_2O_2$ | $H_2O$ |
|---|---|---|---|---|---|
| #1 | 1.0 gm | none | none | none | 25 mls |
| #2 | 1.0 gm | 0.3 gm | 0.23 gm | none | 20 mls |
| #3 | 1.0 gm | 0.3 gm | 0.23 gm | 5 mls | 15 mls |

All of these solutions were of equal volume. They were each placed in evaporating dishes and evaporated to dryness. Results were as follows:

Solution #1: Dried very slowly to pure white residue. Readily dissolved and foamed in water. Aqueous solution showed no Tyndall effect, no color.

Solution #2: Dried more quickly to amber, greaselike consistency. Readily redissolved in water and foamed. Aqueous solution showed strong Tyndall effect, slight amber color.

Solution #3: Dried long before other two, perhaps due to exotherm. Black tar-like residue with gray overlay. Redissolved in water to form clear blood-red solution with a very faint Tyndall effect.

EXAMPLE 15

This example illustrates the modification of the sodium dodecyl benzene sulfonate in the coating bath.

The following solution was prepared:
- 1 gm Ultra wet K (sodium dodecyl benzene sulfonate)
- 0.3 gms ferric fluoride
- 0.23 gms hydrofluoric acid
- 5 mls 30% $H_2O_2$
- 19 mls $H_2O$ After complete mixing, the solution was placed in a polyethylene bottle to observe changes over a period of time.

After 15 hrs., the solution had gone from water-white to a distinct yellow.

After 87 hrs., the solution is gold in color.

After 2 weeks, very little change.

After 5 months, the solution is blood-red in color.

A portion of the solution was poured into an evaporating dish and allowed to dry at room temperature. The residue was a dark, reddish brown, viscous liquid.

EXAMPLE 16

This example illustrates the use of solvent extraction to restore an aged bath. About 25 mls of chlorothene was poured into a large test tube, then about 150 mls of aged bath was added and shaken with just sufficient vigor to mix the two phases. After allowing a moment for separation, the bath was decanted and used to coat a panel as follows:

90 sec. dip, 60 sec air dry, rinse, 10 min. 170° C.

Results:

Jet, uniform, glossy, textured, 0.9 mil.

EXAMPLE 17

This bath illustrates the separation of modified dodecyl benzene sulfonate surfactant from an aged bath.

Using about a 4:1 ratio of aged bath to chlorothene, the combination was mixed in a separatory funnel and the chlorothene layer drawn off. A number of soft black lumps came out with the chlorothene but the bath itself was largely unharmed. The lumps were filtered out and the chlorothene evaporated off. The bottom of the dish was scrubbed vigorously with a rubber policeman and deionized water. The dish appeared to be inordinately hydrophobic at the bottom, but not at the sides. When washed with a 28% $NH_3$ a gummy material was immediately observed and it rapidly went into solution as a dark yellow, very turbid solution. The solution was diluted and made acid with HCl. It was less turbid due to dilution but remained yellow. On addition of $FeSO_4$ solution, there was no increase in turbidity.

The extract gives an IR spectrograph which is almost identical to that obtained from the surfactant stripped from a fresh bath. It is reasonable to expect that even after aging and iron-catalyzed breakdown by $H_2O_2$, the material extracted would probably contain a significant amount of fresh surfactant from the most recent replenishments of the bath which may obscure the infrared trace of the modified material.

EXAMPLE 18

Analysis of an aged bath resulting from continuous operation with an autodepositing coating composition prepared in accordance with Examples 1 and 2 indicated an absence of potassium although potassium is in the resin/pigment concentrate. Depending upon the stage at which the sample is taken, potassium concentration may be minimized by precipitation as insoluble potassium salts. To a 250 ml sample of an aged bath was added 1 g of KF-2H$_2$O solution in increments. When 0.58 g/l of potassium ion was added, there was a slight improvement in the resistance to rinsing when the deposited coating is immediately rinsed with water (running tap). The bath sample was allowed to sit, and on retesting, the rinseability was worse. After several hours, the bath sample appeared to have considerable pigment kick-out, i.e., there were aggregates of pigment on the side walls and the top of the bath appeared almost white. This quickly disappeared with stirring.

A panel was immersed with agitation for 75 seconds in the above bath and rinsed immediately on emergence with running tap water. The coating rinsed away to base metal. Since the bath was apparently deficient in pigment, 0.5 g of Aquablak 115 was added to the 250 ml bath sample by pouring the bath over the 0.5 g sample. No kick-out was observed. A panel was immersed for 75 seconds with agitation. On immediate rinsing, the deposited coating appeared to be more resistant to the water. With persistent rinsing all the coating was rinsed off.

A fresh 250 ml sample of the aged bath (i.e., bath which produced rinseable coatings) was taken. A large sample of Aquablak 115 was weighed out and combined with the sample. The bath was poured into the Aquablak and stirred with no apparent pigment kick-out. A panel was immersed for 75 seconds in the bath with agitation. It was given a 60 second standstill in air and then rinsed with vigorous agitation by water immersion. Most of the coating stayed on. The coating did appear soft as though oxidizer deficient. On curing, the panel showed a 0.4–0.7 mil. film build. The coating on a second panel did not rinse away. On cure, it showed 0.6–0.8 mil film thickness.

One or two drops of 30% $H_2O_2$ was added to the bath (250 mv raised to about 450 mv). A panel was immersed for 75 seconds and rinsed immediately under running tap water. The film stayed on even with more vigorous flow of water and measured 0.6–0.7 mils.

We claim:

1. In an autodepositing coating process wherein an aqueous acidic coating composition having dispersed therein a coating forming resin and a surfactant, wherein said surfactant is modified in the course of the coating operation, the improvement which comprises extracting the modified surfactant with a water immiscible organic solvent.

2. The improvement in an autodepositing process according to claim 1 wherein the surfactant is a salt of an alkyl aryl sulfonate.

3. The improvement in an autodepositing process according to claim 2 wherein the surfactant is sodium dodecylbenzene sulfonate.

4. The improvement in an autodepositing process according to claim 3 wherein the modified surfactant is extracted with 1,1,1-trichlorethane.

* * * * *